US012637532B2

(12) United States Patent
Yan et al.

(10) Patent No.: US 12,637,532 B2
(45) Date of Patent: May 26, 2026

(54) SULFONATED POLYMERS AND COMPOSITIONS THEREOF

(71) Applicant: Kraton Corporation, Houston, TX (US)

(72) Inventors: Jiaqi Yan, Houston, TX (US); Martine Dupont, Amsterdam (NL); Brett Neumann, Savannah, GA (US)

(73) Assignee: Kraton Corporation, The Woodlands, TX (US)

( * ) Notice: Subject to any disclaimer, the term of this patent is extended or adjusted under 35 U.S.C. 154(b) by 679 days.

(21) Appl. No.: 18/161,977

(22) Filed: Jan. 31, 2023

(65) Prior Publication Data

US 2023/0242698 A1     Aug. 3, 2023

Related U.S. Application Data

(60) Provisional application No. 63/267,459, filed on Feb. 2, 2022.

(51) Int. Cl.
| | |
|---|---|
| *C08F 293/00* | (2006.01) |
| *C08F 287/00* | (2006.01) |
| *C08J 3/24* | (2006.01) |

(52) U.S. Cl.
CPC .......... *C08F 293/00* (2013.01); *C08F 287/00* (2013.01); *C08J 3/24* (2013.01); *C08J 2351/00* (2013.01); *C08J 2353/00* (2013.01)

(58) Field of Classification Search
CPC .... B01D 71/82; B01D 2325/42; B01D 71/80; C08L 53/025; C08L 67/00; C08L 75/04; C08L 53/02; C08F 8/36; C08F 297/044
See application file for complete search history.

(56) References Cited

U.S. PATENT DOCUMENTS

| | | | |
|---|---|---|---|
| 2007/0021569 A1* | 1/2007 | Willis ................. | B01D 71/401 |
| | | | 526/287 |
| 2011/0268901 A1* | 11/2011 | Handlin, Jr. ......... | B01D 71/281 |
| | | | 428/36.5 |
| 2013/0015071 A1 | 1/2013 | Willis | |
| 2017/0022329 A1 | 1/2017 | Krutzer et al. | |

FOREIGN PATENT DOCUMENTS

WO     WO-2012043400 A1 *   4/2012   ............ C08F 297/04

OTHER PUBLICATIONS

Naim "Polymer Structure and Characterization" (Year: 2007).*
Kim et al. Journal of Membrane Science 427, 2013, 85-91 (Year: 2013).*
Elabd Y A, et al., "Sulfonation and characterization of poly(styrene-isobutylene-styrene) triblock copolymers at high ion-exchange capacities", Polymer, Elsevier, Amsterdam, NL, Apr. 1, 2003, 3037-3043.

* cited by examiner

*Primary Examiner* — Mark S Kaucher

(57) ABSTRACT

A composition is disclosed comprising a sulfonated styrenic block copolymer (SSBC) having an ion exchange capacity (IEC) of at least 0.5 meq/g; and at least one compound which reacts with the SSBC forming a cross-linked SSBC. The compound is selected from: (i) a cross-linking agent, (ii) a metal cation, and (iii) a non-sulfonated polymer. A film prepared from the composition containing the cross-linked SSBC has a toughness in wet state measured after 1 week of 1.2 to 8 MJ/m³; and a tensile stress in wet state measured after 1 week of 3.2 to 8 MPa, according to ASTM D412. The film can be used as a water purification membrane or an antimicrobial protection layer.

17 Claims, No Drawings

SULFONATED POLYMERS AND COMPOSITIONS THEREOF

RELATED APPLICATIONS

This application claims benefit to U.S. provisional application No. 63/267,459, filed on Feb. 2, 2022, which is hereby incorporated herein by reference.

FIELD

The present disclosure relates to compositions containing sulfonated styrenic block copolymers, methods of preparation, and applications thereof.

BACKGROUND

Various water purification systems are used to purify natural and polluted water sources. The production of pure water for drinking or other industrial purpose demands more specialized filters and/or chemical treatments of water sources. Purification of water can be achieved through membrane filtration, ion exchangers, sub-micron particle filters or nano-filters, ultraviolet light, ozone treatment etc. Membranes have been employed in purification systems to remove contaminants and other particulates. Materials used in the preparation of a membrane play a crucial role in the purification of water and in extending life of the purification system, i.e., durability. Sulfonated block copolymers have been used as membrane materials in water purification systems.

Sulfonated block copolymers have also been used for other applications including batteries, fuel cells, and even as antimicrobial protective layers as in published PCT application WO2021/212147.

There is a need for improved sulfonated styrenic block copolymer compositions with desired properties, particularly in applications exposed to wet conditions such as water purifications, or antimicrobial applications exposed to external environments.

SUMMARY

In one aspect, the disclosure relates to a composition comprising, consisting essentially of, or consists of: (a) a sulfonated styrenic block copolymer (SSBC) having an ion exchange capacity (IEC) of at least 0.5 meq/g, wherein the SSBC is obtained by sulfonation of a styrenic block copolymer (SBC) precursor; and (b) a sufficient amount of at least one compound which reacts with the SSBC forming a cross-linked SSBC. The (b) compound is selected from (i) a cross-linking agent selected from the group consisting of: multi-functional acrylates, compounds having at least two vinyl groups, di-isocyanates, polyisocyanates, polyester diols, and mixtures thereof, (ii) a metal cation selected from the group consisting of: Zn acetate, Fe(II) oxolate, Cu(II) i-butyrate, Ca stearate, Al 2-ethylhexanoate, Ti(IV) 2-ethylhexoxide, Al hydroxide, Al oxide, Al chloride, triethylaluminium, Fe(III) oxide, Cu(II) oxide, Zn oxide, Cu(I) oxide, Ca oxide, and mixtures thereof, and (iii) a non-sulfonated polymer (nSP) having at least one block D', and optionally a block selected from A', B', and mixtures thereof. Each block D' is derived from a conjugated diene monomer, having a vinyl content of at least 35 wt. %, based on total weight of the polymerized conjugated diene monomer in the block D'. Each block A' is derived from at least one compound selected from polymerized (i) para-substituted styrene, (ii) ethylene, (iii) alpha olefins of 3 to 18 carbon atoms, (iv) 1,3-cyclodiene, (v) conjugated dienes, (vi) acrylic esters, (vii) methacrylic esters, and (viii) mixtures thereof. Each block B' is derived from a vinyl aromatic monomer. A film prepared from the composition containing the cross-linked SSBC has a toughness in wet state measured after 1 week of 1.2 to 8 $MJ/m^3$, and a tensile stress in wet state measured after 1 week of 3.2 to 8 MPa, both measurements according to ASTM D412.

In a second aspect, the SBC precursor has a general configuration of: A-B-A, $(A-B)_n(A)$, $(A-B-A)_n$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(A-B-D)_nX$, $(A-D-B-D-A)_nX$, $(A-B-D-B-A)_nX$, or mixtures thereof; wherein n is an integer from 2 to 30, and X is a residue of a coupling agent; blocks A and D are resistant to sulfonation; and block B is susceptible to sulfonation. Each block A comprises polymerized para-substituted styrene monomers selected from the group consisting of para-methyl styrene, para-ethyl styrene, para-n-propyl styrene, para-iso-propyl styrene, para-n-butyl styrene, para-sec-butyl styrene, para-iso-butylstyrene, para-t-butylstyrene, isomers of para-decylstyrene, isomers of para-dodecylstyrene, and mixtures thereof. Each block B comprises the polymerized vinyl aromatic monomers selected from the group consisting of unsubstituted styrene, ortho-substituted styrene, meta-substituted styrene, alpha-methylstyrene, 1,1-diphenylethylene, 1,2-diphenylethylene, and mixtures thereof. Each block D comprises the polymerized conjugated diene monomers selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof.

In a third aspect, the block B has a degree of sulfonation from 10 to 100 mol %, based on total mol of the block B.

In a fourth aspect, the block D has a hydrogenation level of 60 to 99%; and each block A and B independently has a hydrogenation level of up to 20%.

DESCRIPTION

The following terms will be used throughout the specification.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. A list of embodiments presented as "A, B, or C" is to be interpreted as including the embodiments, A only, B only, C only, "A or B," "A or C," "B or C," or "A, B, or C".

"Copolymer" refers to a polymer derived from more than one species of monomer.

"Block copolymer" refers to a copolymer that comprises more than one species of monomer, wherein the monomers are present in blocks. Each block is constituted of a set of monomer units different from the set of monomer of the connected surrounding blocks in the same block copolymer. Each block can be constituted of a homopolymer or a random copolymer.

"Molecular weight" or $M_w$ refers to the polystyrene equivalent molecular weight in kg/mol of a polymer block or a block copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC so calibrated are polystyrene equivalent molecular weights or apparent molecular weights. $M_w$ expressed herein is measured at the peak of the GPC trace and are commonly referred to as polystyrene equivalent "peak molecular weight," designated as $M_p$.

"Curing" refers to a process that produces a material by cross-linking or forming new bonds and/or modifying existing bonds of monomers, oligomers, polymers, or mixtures thereof.

"Cross-linking agent" refers to a compound which forms at least one bond or short sequence of bonds that links one polymer chain to another polymer chain, or one compound to another compound, or one polymer chain to one compound, or one polymer chain to any cross-linking agent compound. Cross-linking generally used to promote a change in the polymers' physical properties. Cross-linking step can be achieved by curing using a thermal or radiation treatment or using neutralization.

"Sulfonated styrenic block polymer" or SSBC refers to a styrenic block copolymer precursor which contains sulfonic acid and/or sulfonate ester groups.

"Non-sulfonated polymer" or "nSP" refers to a polymer which is essentially free of sulfonic acid and/or sulfonate ester functional group.

"Membrane" refers to a continuous, pliable sheet or layer of a material (film, coating, etc.), is a selective barrier which allows something, e.g., molecules, ions, gases, particles, etc., to pass through but stops others.

"Susceptible to sulfonation" refers to a polymer, polymer block, compound, monomer, oligomer, etc., being predisposed, or sensitive, or capable of reaction with sulfur containing compound, e.g., $SO_3$, $H_2SO_4$, etc., under conditions conventionally employed for sulfonation, wherein sulfonation is very likely to occur to obtain a sulfonated product. In embodiments, a polymer block "susceptible to sulfonation" upon sulfonation, the degree of sulfonation is at least 10 mol %, or at least 20 mol %, or at least 30, or at least 50 mol %, or at least 75 mol %, of the total polymer block, for the polymer block to have at least 10 mol %, or at least 20 mol %, or at least 30, or at least 50 mol %, or at least 75 mol % sulfonic acid or sulfonate ester functional groups.

"Resistant to sulfonation" means having little if any sulfonation of the respective block under conditions conventionally employed for sulfonation, with <10 mol %, or <8 mol %, or <5 mol % sulfonic acid or sulfonate ester functional groups in the polymer block.

"Dry" or "dry state" refers to or describe the state of hydration of the material or membrane which has absorbed essentially no or only insignificant amounts of water. For example, a material or membrane which is merely in contact with the atmosphere is considered to be in the dry state.

"Wet" or "wet state" refers to or describe the state at which the material or membrane has reached equilibrium or has been immersed in water for a certain period, e.g., >5 min., >1 hr., >24 hrs., >1 week or more. The properties of the film such as "toughness in wet state," "tensile stress in wet state," etc., refer to properties of the film immersed in water for a specified period, and then taken out from water for testing.

"Water" refers to deionized water, tap water, distilled water, processed water, natural water, spring water, mineral water, sparkling water, hard water, or mixtures thereof.

The present disclosure relates to a composition comprising a sulfonated styrenic block copolymer (SSBC), and at least one compound which reacts with the SSBC forming a cross-linked SSBC. The at least one compound is selected from a cross-linking agent, a metal cation, and a non-sulfonated polymer (nSP). Films prepared from the composition containing the cross-linked SSBC show improved mechanical properties, such as tensile stress, toughness, elongation at break, Young's modulus, etc. The film can be used as a water purification membrane with improved stability in aqueous medium, or in an antimicrobial application with improved durability.

(Sulfonated Styrenic Block Copolymer (SSBC))

The SSBC is obtained by sulfonation of a styrenic block copolymer (SBC) precursor which is any of linear, branched, or radial block copolymer having at least one end block A and at least one interior block B. The SSBC has at least a sulfonate group, e.g., $—SO_3$, either in an acid form (e.g., $—SO_3H$, sulfonic acid) or a salt form (e.g., $—SO_3Na$). The sulfonate group can be in the form of metal salt, ammonium salt, or amine salt.

The sulfonate group containing polymers other than the SSBC can be used to obtain the composition. Non-limiting examples of sulfonate group containing polymers include perfluorosulfonic acid polymers (e.g., sulfonated tetrafluoroethylene), sulfonated polyolefins, sulfonated polyimides, sulfonated polyamides, sulfonated polyesters, polystyrene sulfonates, sulfonated styrenic block copolymers, sulfonated polysulfones such as polyether sulfone, sulfonated polyketones such as polyether ether ketone, sulfonated polyphenylene ethers, and mixtures thereof.

In embodiments, the SSBC is characterized as being sufficiently sulfonated, meaning having at least 10 mol % of sulfonic acid or sulfonate ester functional groups based on total mol of the number of monomer units or polymer blocks to be sulfonated ("degree of sulfonation"). In embodiments, the SSBC has a degree of sulfonation of at least 10 mol %, >15, or >20, or >25, or >30, or >40, or >50, or >60, or >70, or >80, or >90, or >99 mol %. The degree of sulfonation can be calculated by NMR or ion exchange capacity (IEC).

In embodiments, SBC precursor is prepared by anionic polymerization using techniques known in the art. Other methods, such as cationic polymerization, can also be employed. The anionic polymerization initiator is generally an organometallic compound, such as, an organolithium compound, e.g., ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. An amount of initiator needed is calculated based on the molecular weight to be achieved, generally from 0.002 to 5 wt. %, based on amount of monomers to be polymerized. Suitable solvent for the polymerization includes aliphatic, cycloaliphatic, or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, and mixtures thereof. Polymer chain termination can be achieved by quenching with a proton donor or a compound having a leaving group that can be displaced by the carbanionic polymer chain.

If desired, a Lewis base additive, which affects polymerization parameters can also be employed. Examples of Lewis bases include dimethyl ether, diethyl ether, ethylene glycol dimethyl ether, 1,2-diethoxypropane, diethylene glycol dimethyl ether, tetrahydrofuran, tetrahydrofurfuryl ethers, such as tetrahydrofurfuryl methyl ether, and tertiary amines. The additives can influence the extent of 1,2-addition of the conjugated diene, and therefore the vinyl group content in the respective block.

In embodiments, the SBC precursor has a general configuration of: A-B-A, $(A-B)_n(A)$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(A-B-D)_nX$, $(A-D-B-D-A)_nX$, $(A-B-D-B-A)_nX$ or mixtures thereof; where n is an integer from 2 to 30; and X is a residue of a coupling agent. Each block A and D is resistant to sulfonation, and each block B is susceptible to sulfonation.

In embodiments, the coupling agent X includes bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkyl silicon methoxides, alkyl silicon ethoxides, polyfunctional aldehydes, such as terephthalic dialdehyde, ketones, esters, anhydrides or epoxides. In embodiments, the coupling agent is selected from methyltrimethoxysilane (MTMS), methyltriethoxysilane (MTES), tetramethoxysilane (TMOS), dimethyladipate, gamma-glycidoxypropyltrimethoxy silane, and mixtures thereof.

In embodiments, the block A has at least one compound selected from polymerized (i) para-substituted styrene, (ii) ethylene, (iii) alpha olefins of 3 to 18 carbon atoms; (iv) 1,3-cyclodiene, (v) conjugated dienes having a vinyl content of <35 mol % prior to hydrogenation, (vi) acrylic esters, (vii) methacrylic esters, and (viii) mixtures thereof. If the block A is a polymer of 1,3-cyclodiene or conjugated diene, the block A will be hydrogenated subsequent to preparation of the SBC and before sulfonation of the SBC precursor. In embodiments, the block A contains up to 15 wt. % of vinyl aromatic monomers such as those present in the block B.

In embodiments, the block A comprises polymerized para-substituted styrene monomers selected from the group consisting of para-methylstyrene, para-ethylstyrene, para-n-propyl styrene, para-iso-propyl styrene, para-n-butyl styrene, para-sec-butyl styrene, para-iso-butylstyrene, para-t-butylstyrene, isomers of para-decylstyrene, isomers of para-dodecylstyrene, and mixtures thereof.

In embodiments, the block A has a $M_p$ of 1-60, or 2-50, or 5-45, or 8-40, or 10-35, or >1.5, or <50 kg/mol. In embodiments, the block A constitutes from 1-80, or 5-75, or 10-70, or 15-65, or 20-60, or 25-55, or 30-50, or >10, or <75 wt. %, based on total weight of the SBC precursor.

In embodiments, the block B comprises polymerized vinyl aromatic monomers selected from the group consisting of unsubstituted styrene, ortho-substituted styrene, meta-substituted styrene, alpha-methyl styrene, 1,1-diphenylethylene, 1,2-diphenylethylene, and mixtures thereof. In embodiments, the block B has a mixture of the vinyl aromatic monomer and hydrogenated conjugated dienes, such as butadiene or isoprene, having a vinyl content, prior to hydrogenation, of 2-40, or 5-38, or 8-35, or 10-30, or >5, or <40 wt. %, based on total weight of polymerized conjugated diene monomers in the block B.

In embodiments, the block B has a $M_p$ of 10-300, or 20-250, or 30-200, or 40-150, or 50-100, or 60-90, or >15, or <150 kg/mol. In embodiments, the block B constitutes from 10-80, or 15-75, or 20-70, or 25-65, or 30-55, or >10, or <75 wt. %, based on total weight of the SBC precursor. In embodiments, the block B has from 0-25, or 2-20, or 5-15 wt. %, of the para-substituted styrene monomers such as those present in the block A.

In embodiments, the block D comprises a polymer or copolymer of a conjugated diene monomer selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof. In embodiments, the block D has a $M_p$ of 1-60, or 2-50, or 5-45, or 8-40, or 10-35, or 15-30, or >1.5, or <50 kg/mol. In embodiments, the block D constitutes from 10-80, or 15-75, or 20-70, or 25-65, >10, or <75 wt. %, based on total weight of the SBC precursor.

In embodiments, prior to hydrogenation and sulfonation, the block D has a vinyl content of >80, or >85, or >90, or >95, or >98, or >99, or >99.5, or 50-95, or 60-90, or 70-95 wt. %, based on total weight of the polymerized conjugated diene monomers in the block D.

In embodiments, the block D has a hydrogenation level of 60-99%, or 65-95%, or 70-90%, or 75-99%, or >75%, or 85%, or >95%, or >98%.

In embodiments, each block A and B independently has a hydrogenation level of 0-20%, or 2-18%, or 4-15%, or >10%, or >15%, or <20%. A suitable catalyst based on nickel, cobalt or titanium can be used in the hydrogenation step.

The SBC precursor is sulfonated to provide the corresponding SSBC. Sulfonation occurs at the phenyl ring of polymerized styrene units in the block B, predominantly para to the phenyl carbon atom bonded to the polymer backbone. In embodiments, the block B has a degree of sulfonation of 10-100, or 15-95, or 20-90, or 25-85, or 30-80, or 35-75, or 40-70, or >15, or <85 mol %, based on total mol of the block B.

In embodiments, the SSBC is a midblock-sulfonated triblock copolymer, or a midblock-sulfonated pentablock copolymer, e.g., a poly(p-tert-butylstyrene-b-styrenesulfonate-b-p-tert-butylstyrene), or a poly[tert-butylstyrene-b-(ethylene-alt-propylene)-b-(styrenesulfonate)-b-(ethylene-alt-propylene)-b-tert-butylstyrene.

In embodiments, the SSBC has a $M_p$ of 25-500, or 30-450, or 350-400, or 40-350, or 45-300, or 50-250, or >35, or <350 kg/mol.

In embodiments, the SSBC has a glass transition temperature ($T_g$) of 80-180° C., or 85-160° C., or 90-150° C., or 100-140° C., or >90° C., or <210° C., measured by Dynamic Mechanical Analysis (DMA), according to ASTM 4065.

In embodiments, the SSBC has an ion exchange capacity (IEC) of at least 0.5, or >0.75, or >1.0, or >1.5, or >2.0, or >2.5, or 0.5-3.5, or 0.5-2.6, or <5.0 meq/g.

In embodiments, an amount of the SSBC used in the composition is from 50-99.90, or 55-99, or 85-99.90, or 60-95, or 70-90 wt. %, based on total weight of the composition. The remainder of the composition is a compound which reacts with the SSBC to form a cross-linked SSBC under cross-linking conditions. The compound is selected from a cross-linking agent, a metal cation, and a non-sulfonated polymer (nSP). The amount of the SSBC varies depending on the selected compound.

(Cross-Linking Agent)

The cross-linking agent is a reactive compound, e.g., a monomer, oligomer, or polymer, selected from the group consisting of acrylates, compounds having at least two vinyl groups, isocyanurates, polyisocyanates (aliphatic and/or aromatic), di-isocyanates, polyester diols (aliphatic and/or aromatic), silanes such as alkoxy or vinyl silanes, siloxanes, polyether modified siloxanes, thiols, compounds having two or more isopropenyl groups, anhydrides, and mixtures thereof.

Other cross-linking agents can be selected from polymers/oligomers containing at least two vinyl groups. Such cross-linking agents include, styrene-butadiene copolymers, polybutadienes, styrene-butadiene-divinylbenzene copolymers, and the like. Oligomers having at least two vinyl groups and formed from monomers, such as, for example, styrene, α-methylstyrene, vinyltoluene, p-methylstyrene, ethylvinylbenzene, vinylnaphthalene, and mixtures thereof.

In embodiments, the cross-linking agent is selected from an aliphatic polyisocyanate and/or an aliphatic polyester diol.

In embodiments, the cross-linking agent is present in amounts of 0.1-15, or 0.5-12, or 1-10, or 2-8, 0.5-5 wt. %, based on total weight of the composition.

(Metal Cations)

The metal cation is selected from the group consisting of: Zn acetate, Fe(II) oxolate, Cu(II) i-butyrate, Ca stearate, Al 2-ethylhexanoate, Ti(IV) 2-ethylhexoxide, Al hydroxide, Al oxide, Al chloride, triethylaluminium, Fe(III) oxide, Cu(II) oxide, Zn oxide, Cu(I) oxide, Ca oxide, and mixtures thereof. These metal cations when introduced into the SSBC, induce chemical cross-linking of moieties containing sulfonic acid or sulfonate ester functional groups, via ionic complexation.

In embodiments, the metal cation is present in amounts of 0.1-15, or 0.5-12, or 1-10, or 2-8, 0.5-5, or 0.1-3 wt. %, based on total weight of the composition.

(Non-Sulfonated Polymer (nSP))

The nSP is a polymer essentially free of sulfonic acid or sulfonate ester functional groups, comprising at least one block D' and optionally a block selected from A', B', and mixture thereof. Essentially free of sulfonic acid or sulfonate ester functional groups means none is added in the manufacture of the nSP.

In embodiments, block D' is a polymer or copolymer of a conjugated diene monomer selected from isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof. The block D' has a vinyl content of at least 35 wt. %, or 35-90, or 40-90, or 40-80, or 45-75, or 50-80, or 50-75 wt. %, based on total weight of the polymerized conjugated monomers in the block D'.

In embodiments, block A' is derived from any of: polymerized (i) para-substituted styrene, (ii) ethylene, (iii) alpha olefins of 3 to 18 carbon atoms; (iv) 1,3-cyclodiene, (v) conjugated dienes, (vi) acrylic esters, (vii) methacrylic esters, and (viii) mixtures thereof. In embodiments, block B' comprises polymerized vinyl aromatic monomers selected from unsubstituted styrene, ortho-substituted styrene, meta-substituted styrene, alpha-methylstyrene, 1,1-diphenylethylene, 1,2-diphenylethylene, and mixtures thereof.

In embodiments, the nSP is an unhydrogenated SBC (USBC) and comprises block B' and block D'. In embodiments, the block B' constitutes from 5-40, or 10-35, or 12-30, or 14-28, or 15-25, or >8, or <30 wt. %, and the block D' constitutes from 60-95, or 65-90, or 70-90, or 75-85, or >90, or <98 wt. %, based on total weight of the USBC. In embodiments, the block B' has a $M_p$ of 2-70, or 5-60, 8-50, or 10-40, or >4, or <60 kg/mol. In embodiments, the block D' has a $M_p$ of 15-250, or 20-220, or 25-200, or 30-175, or 40-160, or 50-130, or 60-110, or >20, or <150 kg/mol.

In embodiments, the nSP has a $M_p$ of 20-400, or 40-350, or 60-300, or 70-270, or 50-200, or >80, or >120 kg/mol.

In embodiments, the nSP has a general configuration of $(B'\text{-}D'\text{-}3)_nX$, $(D'\text{-}B'\text{-}D')_nX$, $(B'\text{-}D')_nX$, $(B'D')_nX(D)_m$, or mixtures thereof, wherein each m and n is a positive integer from 2 to 30 and X is a residue of a coupling agent having a maximum of active sites S of 3-6, wherein n=1.5 to S-0.5, and m=0.5 to S-1.5. In embodiments, if n is 1.5, the nSP is a mixture of copolymers, e.g., one component has the structure $(B'D')_iX(D)_m$, and another component has the structure $(B'D')_2X(D)_m$. In embodiments, the sum of n and m is >2. In embodiments, the nSP has a coupling efficiency of 50-95%, or 55-90%, or 60-85%, or 65-80%, or >50%, >84%, or <95%.

In embodiments, the nSP has an asymmetric structure with dissimilar lengths and/or configurations of the block B' and/or the block D'. In embodiments, the nSP comprises 2-arm structure, 3-arm structure, 4-arms structure, or mixtures thereof. In embodiments, the nSP comprises 2-arm structure of similar or dissimilar lengths and/or configurations of the block B' and/or the block D' coupled by a coupling agent, from 2-30, or 5-25, or 8-20, or 10-18, or >4, or <20 wt. %, based on total weight of the nSP.

In embodiments, the nSP is functionalized with at least one functional group selected from the group of amino, phosphino, epoxies, anhydrides, silanes, acrylates, hydroxy, carboxylic acids/salts, and mixtures thereof. In embodiments, the nSP contains functionalized monomer units from 1-50, or 5-45, or 10-40, or 15-35, or 20-30 wt. %, based on total monomer units in the nSP.

In embodiments, the nSP is a polybutadiene having a 1,2 vinyl content of at least 70% or >75% or >80% or 60-80%.

In embodiments, the nSP is present in amounts of 1-45, or 3-40, or 4-35, or 5-30, or 6-25, or 7-20, or >2, or <10 wt. %, based on total weight of the composition.

(Optional Initiator)

In embodiments, the composition comprises an initiator selected from thermal initiators, or photo initiators. Non-limiting examples of thermal initiators include di-isobutyl peroxide, di-tert-butyl peroxide, dicumyl peroxide, t-butyl-cumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl, peroxide, lauroyl peroxide, dilauroyl peroxide, 2,5-dimethyl-2,5-di(tert-butylperoxy) hexyne-3, diaryl peroxides, ketone peroxides, peroxydicarbonates, peroxyesters, dialkyl peroxides, hydroperoxides, peroxyketals, and mixtures thereof.

In embodiments, the photo initiator is selected from but not limited to benzophenones, bis-acylphosphine oxide (BAPO), alkylbenzophenones, 4,4'-bis(dimethylamino) benzophenone (Michler's ketone), anthrone, halogenated benzophenones, benzoins, benzoin derivatives, benzoin ethers, benzil ketals, acylphosphine oxides, bisacylphosphine oxides, phenyl-glyoxylic esters, camphorquinone, alpha-aminoalkylphenones, alpha, alpha-dialkoxyacetophenones, alpha-hydroxyalkylphenones, bis(2,4,6-trimethyl-benzoyl)phenylphosphine oxide, 1,2-diphenyl-2,2-dimethoxyethanone, 1,2-octanedione, 1-4-(phenylthio)-2-(o-benzoyloxime) ethanol, 1-[9-ethyl-6-(2-methylbenzoyl)-9H-carbazole-3-Yl]-, 1-(o-acetyloxime), 1-[9-ethyl-6-(2-methylbenzoyl)-9H-carbazol-3-yl]-1-(o-acetyloxime), and mixtures thereof.

In embodiments, the initiator is used in an amount of 0-5, or 0.05-5, or 0.1-4, or 0.05-3 wt. %, based on total weight of the composition.

(Optional Additives)

The composition further comprises at least an additive selected from the group consisting of activators, curing agents, stabilizers, neutralizing agents, thickeners, coalescing agents, slip agents, release agents, antimicrobial agents, surfactants, antioxidants, antiozonants, color change pH indicators, plasticizers, tackifiers, film forming additives, dyes, pigments, UV stabilizers, UV absorbers, catalysts, fillers, other polymers, redox couples, fibers, flame retardants, viscosity modifiers, wetting agents, deaerators, toughening agents, adhesion promoters, colorants, heat stabilizers, light stabilizers, lubricants, flow modifiers, drip retardants, antiblocking agents, antistatic agents, processing aids, stress-relief additives, and mixtures thereof.

Examples of fillers include but are not limited to carbon black, silica, calcium carbonate, carbon nanotube, clay, mica, silicates, talc, titanium dioxide, alumina, aluminum hydroxide, aluminum oxide, zinc oxide, starch, wood flour, and mixtures thereof. The filler can be surface treated with a commonly known surface treating agents, e.g., alkoxysilanes.

UV stabilizers can be selected from the group consisting of resorcinols, salicylates, benzotriazoles, benzophenones, oxanilides, oxanilide-based compounds, hindered amine light stabilizers, piperidinol derivatives, triazines, and mixtures thereof. Specific examples of the UV stabilizer include but not limited to 2-(2-hydroxyphenyl)-benzotriazole, 2,2, 6,6-tetramethyl piperidine, bis(1,2,2,6,6-pentamethyl-4-piperidinyl)-3,5-bis(1,1-dimethylethyl-4-hydroxyphenyl) methyl-butyl propanedioate, 1-acetyl-4-(3-dodecyl-2,5-dioxo-1-pyrrolidinyl)-2,2,6,6-tetramethyl-piperidine, bis(2, 2,6,6-tetramethyl-4-piperdinyl)decanedioate; 1-acetyl-4-(3-dodecyl-2,5-dioxo-1-pyrrolidinyl)-2,2,6,6-tetramethyl-piperidine, 2-hydroxybenzophenones, 2-(2-hydroxyphenyl)-1,3,5-triazines, benzenesulfonic acid, 3-(2H-benzotriazol-2-yl)-4-hydroxy-5-(1-methylpropyl)-, monosodium salt, tris (tetramethylhydroxypiperidinol) citrate, 2-(4,6-bis(2,4-dimethylphenyl)-1,3,5-triazin-2-yl)-5-octyloxyphenol, poly (4-hydroxyethyl-2,2,6,6-tetramethyl-1-piperidineethanol) succinate, bis (1,2,2,6,6-pentamethyl-4-piperidyl)sebacate, poly{[6-[(1,1,3,3-tetramethylbutyl)amino]]-1,3,5-triazine-2,4-[(2,2,6,6-tetramethyl-piperidyl)imino]-1,6-hexamethylene-bis[(2,2,6,6-tetramethyl-4-piperidyl)imino]}, polysuccinic acid, (4-hydroxy-2,2,6,6-tetramethyl-1-piperidineethanol)ester, poly[(6-morpholinyl-5-triazine-2,4-diyl) (2,2,6,6-tetramethylpiperidinyl)iminohexamethylene [(2,2, 6,6-tetramethylpiperidyl)-imino]], 4-benzoyloxy-2,2,6,6-tetramethylpiperidine, tris(1,2,2,6,6-pentapiperidinyl) phosphite, and mixtures thereof.

In embodiments, optional additives added in amounts of 0-30, 1-25, or 3-20, or 5-15, or 1-10 wt. %, based on total weight of the composition.

In embodiments, the composition further comprises at least one polymer other than the SSBC or the nSP. The at least one polymer can be selected from the group consisting of polytetrafluoroethylenes (PTFEs), polyolefins, polyimides, polyamides, polyesters, polystyrenes, polysulfones, polyketones, polyphenylene ethers, polyisoprenes, polybutadienes, polyvinylidene fluorides, polycarbonates, polyetherimides, ethylene-vinyl alcohol copolymers, polyvinylidene chlorides, polyacrylates, polytertbutylstyrene, and mixtures thereof, in amounts of 0-50, or 5-30, or 10-35, or 5-20, or 1-15 wt. %, based on total weight of the composition.

In embodiments, the composition comprises 50-99.90 wt. % of the SSBC and 0.1-50 wt. % of at least one compound which reacts with the SSBC forming a cross-linked SSBC, which has any of formulations below:

85-99.90 wt. % of the SSBC, and 0.1-15 wt. % of a cross-linking agent.

85-99.90 wt. % of the SSBC, and 0.1-15 wt. % of a metal cation.

55-99 wt. % of the SSBC, and 1-45 wt. % of a nSP.

(Preparation Methods)

In embodiments, the composition is prepared by mixing any desirable amounts of components of the composition in a suitable solvent to obtain a dispersion or solution of the composition. The solvent is selected from the group consisting of protic, aprotic, polar, nonpolar, and mixtures thereof. In embodiments, the solvent includes but not limited to cyclopentane, cyclohexane, cycloheptane, cyclooctane, hexane, heptane, nonane, decane, paraffinic oil, methyl-tert-butyl ether, tetrahydrofuran (THF), dioxan, ethyl acetate, dimethylsulfoxide (DMSO), dimethylformamide (DMF), methanol, ethanol, propanol, butanol, toluene, xylene, and mixtures thereof.

In embodiments, the concentration of all components of the composition in the solvent or mixture of solvents is from 2-70, or 5-65, or 10-60, or 15-55, or 20-50, or 25-45, or >5, or <50 wt. %, based on total weight of the dispersion or solution of the composition. In embodiments, the dispersion/solution of the composition is subjected to boiling point of the employed solvent, or 25-90° C., or 30-85° C., or 35-80° C., or 40-75° C., >40° C., or <80° C., and for sufficient time in the range of 1 min.-24 hrs., or 5 min.-2 hrs., or 10 min.-1 hr., or 20 min.-40 min., or >5 min., or <1 hr., to obtain the solution/dispersion of the composition.

All components of the composition are individually or more than one, can be separately mixed in the solvent and mixtures of such dispersions/solutions are finally combined to obtain the composition.

After the composition is prepared, depending on the end-use application, it can be made into articles, e.g., films or membranes. In embodiments, a film is prepared by coating the composition onto a substrate (e.g., polymers, metals, ceramic, or glass, etc.) and then dried to remove the solvent. Coating can be by any of spray coating, electro-coating, electro-spinning, direct coating, transfer coating, dip coating, slot-die coating, and the like.

(Cross-Linking or Curing by Thermal/Radiation Treatment)

Depending on the application, the article, e.g., film, membrane, etc., obtained from the composition containing the SSBC is cross-linked by any of neutralization, ionic complexation, or by curing using thermal or radiation treatments. Cross-linking can be achieved by heat, UV radiation, gamma radiation, electron-beam, or in microwave, in the presence or absence of a thermal or photoinitiator.

In embodiments, the cross-linking or curing of the film in the presence of the thermal initiator is conducted at a temperature of 40-200° C., or 45-180° C., or 50-150° C., or 55-120° C., or 60-100° C., or >45° C., or <140° C., and for a period of 1-240 min. or 2-220 min., or 5-200 min., or 10-150 min., or 15-100 min., or 20-60 min., or >2 min., or <60 min.

In embodiments, the cross-linking or curing of the film is performed by exposing the film to E-beam or gamma radiation having a dose of radiation from 10-250 kGy (kiloGray), or 20-220, or 30-200, or 40-180, or 50-160, or 60-150, >20, or <220 kGy. The E-beam processing can be effected with an electron accelerator, e.g., any of electro-static direct-current (DC), electrodynamic DC, radiofrequency (RF) linear accelerators (LINACS), magnetic-induction LINACs, and continuous-wave (CW) machines.

In embodiments, the specimen, or the film before or after cross-linking or curing is treated with a solvent annealing step. The solvent annealing of the film can be achieved by placing the film in a closed chamber with the solvent reservoir for a period of 1-96 hrs., or 2-72 hrs., or 5-48 hrs., or 12-40 hrs., or >10 hrs. In embodiments, the solvent is directly sprayed on the film for a period of 2 sec.-1 min., or 5 sec.-40 sec., or 10 sec.-30 sec., or >2 sec., to cover the film sample with the solvent. The solvent can be any polar solvent, e.g., water, hexafluoroisopropanol, trifluoroethanol, ethylene glycol, methanol, ethanol, acetic acid, benzyl alcohol, 2-propanol, and mixtures thereof.

In embodiments, the film has a thickness of 1-400 μm, or 2-200 μm, or 5-100 μm, or 10-50 μm, or >2 μm, or <40 μm.

In embodiments, the film is heat laminated, solvent laminated, or adhesive laminated onto a microporous support substrate for use in the water purification system. Non-limiting examples of the microporous support substrate include polyester, polyethylene, polypropylene, polyethylene terephthalate, cellulose, cellulose nitrate, cellulose acetate, nylon, polytetrafluoroethylene, a fibrous woven or a non-woven material, and the like. Alternatively, the membrane can be supported onto commercially available membranes.

(Properties of Articles Made from Composition)

In embodiments, the composition is used for making films or membranes (collectively used as "film"). The film is elastic and has a good balance of low swell and high moisture vapor transmission rate (MVTR). The film is highly dimensionally stable in the presence of water and has strength in wet and dry state, good water and ion transport characteristics, methanol resistance, barrier properties, controlled flexibility, adjustable hardness, thermal/oxidative stability, and has anti-microbial property. The film possesses improved electrical properties such as high dielectric constant, low tangent loss angles, high breakdown voltages, and high bulk resistance. In embodiments, the film can prevent passing through the film, particulate matter, such as dust or air borne contaminants, bacteria, and viruses. The film has sufficient flexibility such that the film is capable of being rolled, screwed in both dry and wet condition, cut, and meshed without breaking or deforming.

In embodiments, the film exhibits excellent strengths in wet state with high rates of water and/or anion transport across the film, exceptional barrier properties for organic and non-polar liquids and gases, suitable for use water purification membranes to removes metal, e.g., copper, chromium, etc., from target water stream.

The mechanical properties of a film containing the cross-linked SSBC as shown below are per ASTM D412.

In embodiments, the film has a tensile stress in dry state of 6.2-30, or 6.5-18, or 7-15, or 7.5-14, or 8-12, or >6.5, or <15 MPa, and a tensile stress in wet state measured after 1 day (24 hrs.), of 3-10, or 3.5-8, or 4-7.5, or 4.5-7, or >3.5, or <8 MPa. In embodiments, the film has a tensile stress in wet state measured after 1 week, of 3.2-8, or 3.3-7.5, or 3.5-7, or 3.75-6.5, or 4-6, or >3, or <6.5 MPa.

In embodiments, the film has a toughness in dry state of 3-25, or 3.2-22, or 3.5-20, or 3.8-18, or 4-15, or 4.2-12, or 4.5-10, or >3.5, or <15 MJ/m³ and a toughness in wet state measured after 1 day (24 hrs.), of 1.5-10, or 2-9, or 2.5-8, or 3-7.5, or 3.5-7, or >1.5, or <7 MJ/m³. In embodiments, the film has a toughness in wet state measured after 1 week, of 1.2-8, or 1.2-7.5, or 1.5-7, or 1.8-6.5, or 2-6, or >1.2, or <6 MJ/m³.

In embodiments, the film has a Young's modulus in dry state of 190-600, or 195-500, or 200-450, or 220-400, or 240-360, or 250-350, or >95, or <450 MPa. In embodiments, a film has a Young's modulus in wet state measured after 1 day (24 hrs.), of 6-70, or 10-60, or 12-50, or 15-45, 20-40, or >7, or <50 MPa. In embodiments, the film has a Young's modulus in wet state measured after 1 week, of 7.5-70, or 8-65, or 9-60, or 10-55, or 12-50, or 15-45, or >8, or <60 MPa.

In embodiments, the film has an elongation at break in dry state of 75-250%, or 80-220%, or 85-200%, or 90-180%, or 95-160%, or 100-150%, or >75%, or <180% and an elongation at break in wet state measured after 1 day (24 hrs.), of 85-160%, or 90-140%, or 95-130%, or 100-125%, or >85%, or <155%. In embodiments, the film has an elongation at break in wet state measured after 1 week, of 60-150%, or 65-140%, or 70-130%, or 80-120%, or >60%, or <135%.

In embodiments, the film has a swellability in water, after 1 week, of <70%, or <90%, or <100%, or <120%, or <150%, or <200%, or <250%, or between 40-300%, or 50-250%, or 60-220, or 70-200%, or 80-180%, or 100-160%, based on total initial weight of the film.

In embodiments, the film has a MVTR in an upright manner of 1000-30000, or 5000-28000, or 6000-25000, or 7000-22000, or 8000-20000, or 9000-18000, or >3000, or <25000 g/m²/day. In embodiments, the film has a MVTR in an upside down manner of 1000-150000, or 5000-140000, or 8000-120000, or 15000-100000, or 20000-80000, or >15000, or <125000 g/m²/day. MVTR measurements are per ASTM E96/E96M in an upright or upside down manner at 50° C. and at 10% of humidity.

(Applications)

A film obtained from the composition (after cross-linking) can be used in variety of applications including but not limited to energy storage applications, electrical capacitors, super capacitors, water purification membranes, coatings for cleanroom workwear, and numerous medical applications such as wound dressings, surgeons' gowns, drapes and other biologically protective garments or barrier covers where moisture-vapor permeability is useful, and elasticity is desirable. The water purification membrane can be a microfiltration membrane, an ultrafiltration membrane, a nanofiltration membrane, or a reverse osmosis membrane.

The film can be used in fuel cell (separator phase), proton exchange membranes for fuel cells, battery, or device for energy storage, harvesting, or recovery, for reverse or forward electrodialysis, for controlling humidity, separation cell (electrolyte barrier) for metal recovery processes, forward or reverse osmosis, for electro- or capacitive deionization, or for purifying or detoxifying gases or liquids, for wastewater treatment, air condition (AC) dehumidification, and food storage.

In embodiments, the film is deposited on one or both sides of the substrate for end-use applications. Non-limiting examples of the substrate include carbon, fiberglass, polyester, polyethylene, polypropylene, polyethylene terephthalate, cellulose, cellulose nitrate, cellulose acetate, nylon, polytetrafluoroethylene, a fibrous woven or a non-woven material, and the like.

In embodiments, the film is used in a flow battery for an electric storage device or an electric storage system for conducting ions, e.g., lithium ion, sodium ion, and the like. The film when used in a flow battery has low swelling property when in contact with a non-aqueous liquid and can provide high ion exchange capacity. In embodiments, the film has a large charging capacity and maintains the charge-discharge property for a long time, has a high dielectric constant and a potential window of not more than 4 volts.

EXAMPLES

The following examples are intended to be non-limiting.

Polymer molecular weights are determined by GPC using polystyrene calibration standards according to ASTM 5296.

The viscoelastic behavior is measured by DMA according to ASTM 4065.

Mechanical properties, including toughness, Young's modulus, tensile strength, and elongation at break, in the dry state are measured according to ASTM D412.

Mechanical properties, including Young's modulus, tensile strength, and elongation at break, in the wet state are measured similar to the method according to ASTM D412 using samples that have been equilibrated under water prior to testing.

MVTR measurements of samples are performed according to ASTM E96/E96M.

The degree of sulfonation of samples is determined by potentiometric titration.

The components used in examples include:

SSBC-1: A sulfonated penta-block copolymer of the structure poly[tert-butylstyrene-b-(ethylene-alt-propylene)-b-(styrene-co-styrene-sulfonate)-b-(ethylene-alt-propylene)-tert-butylstyrene] (tBS-EP-sPS-EP-tBS) with 52% degree of sulfonation. The tBS block has a $M_p$ of about 15 kg/mol, the EP blocks each has a $M_p$ of about 12 kg/mol, and the interior sPS block has a $M_p$ of about 22 kg/mol. The SSBC-1 has an IEC of 2.0 mmol/g at 10.5 wt. % solids in an apolar solvent mixture of 1:1 cyclohexane/heptane).

nSP-1: A styrene block copolymer of structure $(A'B')_2X$ $(B')_2$, wherein A is a polystyrene block and B is a butadiene block having a 1,2-vinyl content of 57% by weight, X is gamma-glycidoxypropyltrimethoxy silane, and a coupling efficiency is 89%. nSP-1 has a PSC of 20 wt. %, a butadiene content of 80 wt. %, a vinyl content of 60 wt. %, a coupling efficiency of >84%, and a $M_p$ of 230 kg/mol.

nSP-2: A polybutadiene resin from Cray Valley USA, LLC, having a number average molecular weight of 4.7 kg/mol, and a 1,2 vinyl content of 85%.

Tolonate™ HDB 75 is an aliphatic polyisocyanate from Vencorex Chemicals.

K-FLEX® 188 is an aliphatic polyester diol from King Industries.

Example 1

SSBC-1 films were thermally treated at 120° C. for 10 and 30 minutes. Some film samples were not placed in grill plate inside the oven but exposed to heat in open air, indicated as "Air."

Example 2

SSBC-1 (98 wt. %) and nSP-2 (2 wt. %) were mixed in toluene/1-proponal solvent mixture (50/50 wt. %) to yield a 20 wt. % concentrated dispersion/solution. The dispersion/solution was left overnight on roller to achieve complete dissolution. Film samples were prepared of 25 μm (1 mil) thickness each by automatic film applicator. The thermal curing of films was conducted at 120° C. for different period in an oven.

Example 3

The procedure of example 2 was repeated except for the amount of nSP-2. The amounts of SSBC-1 and nSP-2 were 95 wt. % and 5 wt. % respectively.

Example 4

The procedure of example 2 was repeated having 95 wt. % of the SSBC-1 and 5 wt. % of the nSP-1.

Example 5

The procedure of example 2 was repeated for multiple samples with varying weights of SSBC-1 and nSP-1 or nSP-2 and films were cured by E-beam at 200 kGy.

Example 6

The procedure of example 2 was repeated except nSP-1 was used instead. The film was prepared containing 94.4 wt. % of the SSBC-1, 5 wt. % of the nSP-1, 0.5 wt. % of 1,6-hexanediol diacrylate (HDDA), and 0.1 wt. % of Irgacure-651 photoinitiator. The film was cured by using UV radiation.

Example 7

The procedure of example 2 was repeated except cross-linking agents were used instead of nSP-2. The SSBC-1 was mixed with mixture of cross-linking agents for multiple samples: (a) 4 wt. % of Tolonate™ HDB 75 and 1 wt. % K-FLEX® 188, (b) 2 wt. % of Tolonate™ HDB 75 and 1 wt. % K-FLEX® 188, and (c) 3 wt. % of Tolonate™ HDB 75 and 1 wt. % K-FLEX® 188. The amount of 95 wt. % of the SSBC-1 was mixed with (a), 97 wt. % of the SSBC-1 was mixed with (b), and 96 wt. % of the SSBC-1 was mixed with (c).

Example 8

The procedure of example 2 was repeated except nSP-1 was used instead for multiple samples with varying weights of SSBC-1 and nSP-1. Films were cured by UV radiation in the presence of 4 wt. % of Omnirad 819 photoinitiator. In example 8a, the film is prepared from 96 wt. % of SSBC-1 and 4 wt. % of Omnirad 819 photoinitiator.

Mechanical properties of films obtained from examples 1 to 8 are shown in tables 1, 2, and 3. WVTR properties are shown in table 4.

Example 9

SSBC-1 was dissolved in cyclohexane to have 20 wt. % concentration. A suitable amount of the metal cation (triethylaluminium, TEA) was added drop by drop to obtain desired degree of neutralization (based on stoichiometry of SSBC-1 and TEA, in mol %). Table 5 shows mechanical performance of compositions (dry state).

TABLE 5

| Examples | | Toughness (MJ/m³) | Elongation at break (%) | Tensile strength (MPa) | Young's Modulus (MPa) |
|---|---|---|---|---|---|
| 5a. SSBC-1 (No neutralization) | | 5.46 | 70.0 | 12.72 | 8.98 |
| SSBC-1 with degree of neutralization (%) | | — | — | — | — |
| 5b. | 10 | 3.03 | 28.6 | 16.73 | 11.89 |
| 5c. | 20 | 5.67 | 45.4 | 18.06 | 6.16 |
| 5d. | 30 | 5.52 | 37.2 | 20.54 | 6.82 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| Examples | SSBC-1 (wt. %) | nSP (wt. %) | Cross-linking agent and/or initiator (wt. %) | Curing conditions | Time of curing | DRY STATE | | | |
|---|---|---|---|---|---|---|---|---|---|
| | | | | | | Toughness (MJ/m$^3$) | Elongation at break (%) | Tensile Stress (MPa) | Young's Modulus (MPa) |
| Comp. Ex. | 100 | — | — | — | — | 2.8 | 72.2 | 6.1 | 189.0 |
| Example 1a | 100 | — | — | 120° C. | 10 min. (Air) | 3.1 | 46.0 | 7.9 | 368.1 |
| Example 1b | 100 | — | — | 120° C. | 30 min. (Air) | 5.5 | 76.3 | 9.4 | 366.5 |
| Example 1c | 100 | — | — | 120° C. | 10 min. | 9.4 | 134.2 | 9.6 | 292.5 |
| Example 1d | 100 | — | — | 120° C. | 30 min. | 8.3 | 110.3 | 9.5 | 365.3 |
| Example 2a | 98 | 2 (nSP-2) | — | — | — | 12.8 | 165.9 | 10.8 | 361.2 |
| Example 2b | 98 | 2 (nSP-2) | — | 120° C. | 10 min. | 7.8 | 135.6 | 7.8 | 285.7 |
| Example 2c | 98 | 2 (nSP-2) | — | 120° C. | 30 min. | 9.2 | 131.1 | 9.5 | 292.3 |
| Example 3a | 95 | 5 (nSP-2) | — | — | — | 13.2 | 201.1 | 9.9 | 199.3 |
| Example 3b | 95 | 5 (nSP-2) | — | 120° C. | 10 min. | 11.0 | 143.6 | 10.5 | 376.5 |
| Example 3c | 95 | 5 (nSP-2) | — | 120° C. | 30 min. | 6.1 | 93.3 | 10.5 | 436.2 |
| Example 4a | 95 | 5 (nSP-1) | — | — | — | 7.9 | 118.8 | 7.9 | 364.8 |
| Example 4b | 95 | 5 (nSP-1) | — | 120° C. | 10 min. | 11.2 | 167.7 | 9.9 | 181.7 |
| Example 4c | 95 | 5 (nSP-1) | — | 120° C. | 30 min. | 15.7 | 205.4 | 12.1 | 211.0 |
| Example 5a | 100 | | — | EB - 200 | — | 3.2 | 45.2 | 8.6 | 315.1 |
| Example 5b | 98 | 2 (nSP-2) | — | EB - 200 | — | 3.2 | 50.9 | 7.2 | 277.4 |
| Example 5c | 95 | 5 (nSP-2) | — | EB - 200 | — | 4.0 | 65.6 | 7.0 | 270.7 |
| Example 5d | 95 | 5 (nSP-1) | — | EB - 200 | — | 5.6 | 88.5 | 7.3 | 285.2 |
| Example 6 | 94.4 | 5 (nSP-1) | HDDA (0.5) + Irgacure-651 (0.1) | UV | — | 6.5 | 132.4 | 6.4 | 236.4 |
| Example 7a-i | 95 | — | Tolonate ™ HDB 75 (4) + K-FLEX ® 188 (1) | 90° C. | 10 min. | 22.3 | 288.8 | 13.2 | 199.1 |
| Example 7a-ii | 95 | — | Tolonate ™ HDB 75 (4) + K-FLEX ® 188 (1) | 60° C. | 10 min. | 17.5 | 238.6 | 12.2 | 202.6 |
| Example 7b-i | 97 | — | Tolonate ™ HDB 75 (2) + K-FLEX ® 188 (1) | 60° C. | 10 min. | 16.5 | 230.4 | 12.1 | 209.1 |
| Example 7b-ii | 97 | — | Tolonate ™ HDB 75 (2) + K-FLEX ® 188 (1) | 90° C. | 10 min. | 21.4 | 229.7 | 14.3 | 242.5 |
| Example 7c | 96 | — | Tolonate ™ HDB 75 (3) + K-FLEX ® 188 (1) | 90° C. | 10 min. | 23.3 | 269.0 | 14.7 | 224.5 |
| Example 8a | 96 | — | Omnirad 819 (4) | UV | — | 14.6 | 176.1 | 10.2 | 324.2 |
| Example 8b | 90.7 | 5.3 (nSP-1) | Omnirad 819 (4) | UV | — | 17.4 | 201.1 | 11.8 | 354.8 |
| Example 8c | 88.5 | 7.5 (nSP-1) | Omnirad 819 (4) | UV | — | 16.4 | 190.6 | 11.2 | 310.8 |
| Example 8d | 84.9 | 11.1 (nSP-1) | Omnirad 819 (4) | UV | — | 14.4 | 180.5 | 10.1 | 309.2 |
| Example 8e | 78.4 | 17.6 (nSP-1) | Omnirad 819 (4) | UV | — | 8.6 | 145.7 | 7.1 | 237.4 |
| Example 8f | 71 | 25.0 (nSP-1) | Omnirad 819 (4) | UV | — | 6.8 | 154.1 | 6.0 | 125.7 |
| Example 8g | 62.7 | 33.3 (nSP-1) | Omnirad 819 (4) | UV | — | 14.5 | 208.5 | 10.0 | 254.3 |
| Example 8h | 53.1 | 42.9 (nSP-1) | Omnirad 819 (4) | UV | — | 17.9 | 273.6 | 10.5 | 192.6 |

TABLE 2

| Examples | SSBC-1 (wt. %) | nSP (wt. %) | Cross-linking agent and/or initiator (wt. %) | Curing conditions | Time of curing | WET STATE (after 1 day) | | | |
|---|---|---|---|---|---|---|---|---|---|
| | | | | | | Toughness (MJ/m³) | Elongation at break (%) | Tensile Stress (MPa) | Young's Modulus (MPa) |
| Comp. Ex. | 100 | — | — | — | — | 1.4 | 82.8 | 2.8 | 6.0 |
| Example 1a | 100 | — | — | 120° C. | 10 min. (Air) | 3.1 | 95.2 | 4.5 | 45.9 |
| Example 1b | 100 | — | — | 120° C. | 30 min. (Air) | 4.0 | 107.6 | 5.1 | 45.3 |
| Example 1c | 100 | — | — | 120° C. | 10 min. | 2.0 | 95.0 | 3.4 | 8.0 |
| Example 1d | 100 | — | — | 120° C. | 30 min. | 2.8 | 97.8 | 4.2 | 20.2 |
| Example 2a | 98 | 2 (nSP-2) | — | — | — | 1.2 | 86.5 | 2.2 | 5.4 |
| Example 2b | 98 | 2 (nSP-2) | — | 120° C. | 10 min. | 1.9 | 74.5 | 3.6 | 15.9 |
| Example 2c | 98 | 2 (nSP-2) | — | 120° C. | 30 min. | 3.5 | 107.2 | 4.9 | 29.4 |
| Example 3a | 95 | 5 (nSP-2) | — | — | — | 1.8 | 99.6 | 3.0 | 5.6 |
| Example 3b | 95 | 5 (nSP-2) | — | 120° C. | 10 min. | 3.1 | 101.1 | 4.8 | 21.5 |
| Example 3c | 95 | 5 (nSP-2) | — | 120° C. | 30 min. | 2.2 | 67.2 | 4.7 | 32.0 |
| Example 4a | 95 | 5 (nSP-1) | — | — | — | 2.1 | 94.5 | 3.6 | 8.1 |
| Example 4b | 95 | 5 (nSP-1) | — | 120° C. | 10 min. | 2.8 | 106.8 | 3.9 | 17.7 |
| Example 4c | 95 | 5 (nSP-1) | — | 120° C. | 30 min. | 5.4 | 147.2 | 5.5 | 43.7 |
| Example 5a | 100 | — | — | — | — | 2.6 | 75.4 | 4.9 | 22.7 |
| Example 5b | 98 | 2 (nSP-2) | — | EB - 200 | — | 1.1 | 58.5 | 2.9 | 12.3 |
| Example 5c | 95 | 5 (nSP-2) | — | EB - 200 | — | 1.1 | 55.4 | 3.0 | 11.2 |
| Example 5d | 95 | 5 (nSP-1) | — | EB - 200 | — | 1.4 | 73.6 | 2.9 | 15.2 |
| Example 6 | 94.4 | 5 (nSP-1) | HDDA (0.5) + Irgacure-651 (0.1) | UV | — | 2.1 | 81.9 | 3.9 | 27.8 |
| Example 7a-i | 95 | — | Tolonate ™ HDB 75 (4) + K-FLEX ® 188 (1) | 90° C. | 10 min. | 5.2 | 156.8 | 5.3 | 10.6 |
| Example 7a-ii | 95 | — | Tolonate ™ HDB 75 (4) + K-FLEX ® 188 (1) | 60° C. | 10 min. | 1.8 | 100.2 | 3 | 6.4 |
| Example 7b-i | 97 | — | Tolonate ™ HDB 75 (2) + K-FLEX ® 188 (1) | 60° C. | 10 min. | 1.7 | 87.3 | 3.1 | 9.1 |
| Example 7b-ii | 97 | — | Tolonate ™ HDB 75 (2) + K-FLEX ® 188 (1) | 90° C. | 10 min. | 4.6 | 157.0 | 5.3 | 6.8 |
| Example 7c | 96 | — | Tolonate ™ HDB 75 (3) + K-FLEX ® 188 (1) | 90° C. | 10 min. | 3.4 | 140.6 | 4.3 | 6.2 |
| Example 8a | 96 | — | Omnirad 819 (4) | UV | — | 2.6 | 111.2 | 3.3 | 11.0 |
| Example 8b | 90.7 | 5.3 (nSP-1) | Omnirad 819 (4) | UV | — | 4.1 | 149.6 | 4.3 | 10.2 |
| Example 8c | 88.5 | 7.5 (nSP-1) | Omnirad 819 (4) | UV | — | 3.0 | 118.0 | 3.8 | 16.4 |
| Example 8d | 84.9 | 11.1 (nSP-1) | Omnirad 819 (4) | UV | — | 3.0 | 120.7 | 3.7 | 15.4 |
| Example 8e | 78.4 | 17.6 (nSP-1) | Omnirad 819 (4) | UV | — | 4.1 | 160.1 | 4.0 | 9.1 |
| Example 8f | 71 | 25.0 (nSP-1) | Omnirad 819 (4) | UV | — | 2.5 | 115.3 | 3.3 | 12.1 |
| Example 8g | 62.7 | 33.3 (nSP-1) | Omnirad 819 (4) | UV | — | 2.5 | 111.7 | 3.5 | 11.9 |
| Example 8h | 53.1 | 42.9 (nSP-1) | Omnirad 819 (4) | UV | — | 4.3 | 179.1 | 4.2 | 7.0 |

TABLE 3

| Examples | SSBC-1 (wt. %) | nSP (wt. %) | Cross-linking agent and/or initiator (wt. %) | Curing conditions | Time of curing | WET STATE (after 1 week) | | | |
|---|---|---|---|---|---|---|---|---|---|
| | | | | | | Toughness (MJ/m³) | Elongation at break (%) | Tensile Stress (MPa) | Young's Modulus (MPa) |
| Comp. Ex. | 100 | — | — | — | — | 1.0 | 57.4 | 3.0 | 7.4 |
| Example 1a | 100 | — | — | 120° C. | 10 min. (Air) | 2.0 | 95.8 | 3.3 | 27.4 |
| Example 1b | 100 | — | — | 120° C. | 30 min. (Air) | 2.0 | 77.5 | 3.6 | 41.6 |
| Example 1c | 100 | — | — | 120° C. | 10 min. | 1.3 | 69.5 | 2.9 | 8.0 |
| Example 1d | 100 | — | — | 120° C. | 30 min. | 1.7 | 73.0 | 3.4 | 19.6 |
| Example 2a | 98 | 2 (nSP-2) | — | — | — | 1.3 | 87.2 | 2.4 | 5.7 |
| Example 2b | 98 | 2 (nSP-2) | — | 120° C. | 10 min. | 1.2 | 65.3 | 2.6 | 15.7 |
| Example 2c | 98 | 2 (nSP-2) | — | 120° C. | 30 min. | 2.4 | 73.8 | 4.2 | 37.3 |
| Example 3a | 95 | 5 (nSP-2) | — | — | — | 1.5 | 87.4 | 2.8 | 5.8 |
| Example 3b | 95 | 5 (nSP-2) | — | 120° C. | 10 min. | 1.1 | 49.6 | 3.2 | 28.3 |
| Example 3c | 95 | 5 (nSP-2) | — | 120° C. | 30 min. | 1.0 | 49.1 | 2.8 | 23.7 |
| Example 4a | 95 | 5 (nSP-1) | — | — | — | 1.4 | 83.9 | 2.6 | 6.6 |
| Example 4b | 95 | 5 (nSP-1) | — | 120° C. | 10 min. | 2.1 | 87.6 | 3.5 | 22.5 |
| Example 4c | 95 | 5 (nSP-1) | — | 120° C. | 30 min. | 5.0 | 131.7 | 5.5 | 59.0 |
| Example 5a | 100 | | — | EB - 200 | — | 1.5 | 62.6 | 3.4 | 39.4 |
| Example 5b | 98 | 2 (nSP-2) | — | EB - 200 | — | 1 | 57.9 | 2.7 | 11.8 |
| Example 5c | 95 | 5 (nSP-2) | — | EB - 200 | — | 0.6 | 41.1 | 2.1 | 10.9 |
| Example 5d | 95 | 5 (nSP-1) | — | EB - 200 | — | 1.4 | 70.7 | 2.8 | 20.2 |
| Example 6 | 94.4 | 5 (nSP-1) | HDDA (0.5) + Irgacure-651 (0.1) | UV | — | 2.5 | 91.2 | 4 | 32.8 |
| Example 7a-i | 95 | — | Tolonate ™ HDB 75 (4) + K-FLEX ® 188 (1) | 90° C. | 10 min. | 4.8 | 152.3 | 5.1 | 10.9 |

TABLE 3-continued

| | | | | | | WET STATE (after 1 week) | | | |
| Examples | SSBC-1 (wt. %) | nSP (wt. %) | Cross-linking agent and/or initiator (wt. %) | Curing conditions | Time of curing | Toughness (MJ/m$^3$) | Elongation at break (%) | Tensile Stress (MPa) | Young's Modulus (MPa) |
|---|---|---|---|---|---|---|---|---|---|
| Example 7a-ii | 95 | — | Tolonate ™ HDB 75 (4) + K-FLEX ® 188 (1) | 60° C. | 10 min. | 1.6 | 96 | 2.8 | 6.6 |
| Example 7b-i | 97 | — | Tolonate ™ HDB 75 (2) + K-FLEX ® 188 (1) | 60° C. | 10 min. | 1.7 | 85.6 | 3.1 | 9.5 |
| Example 7b-ii | 97 | — | Tolonate ™ HDB 75 (2) + K-FLEX ® 188 (1) | 90° C. | 10 min. | 1.8 | 86.0 | 3.3 | 8.9 |
| Example 7c | 96 | — | Tolonate ™ HDB 75 (3) + K-FLEX ® 188 (1) | 90° C. | 10 min. | 2.5 | 113.2 | 3.7 | 7.3 |
| Example 8a | | — | Omnirad 819 (4) | UV | — | 2.7 | 105.8 | 3.5 | 16.3 |
| Example 8b | 90.7 | 5.3 (nSP-1) | Omnirad 819 (4) | UV | — | 3.8 | 147.4 | 4.1 | 11.5 |
| Example 8c | 88.5 | 7.5 (nSP-1) | Omnirad 819 (4) | UV | — | 2.8 | 112.8 | 3.6 | 15.5 |
| Example 8d | 84.9 | 11.1 (nSP-1) | Omnirad 819 (4) | UV | — | 3.2 | 121.5 | 3.9 | 16.8 |
| Example 8e | 78.4 | 17.6 (nSP-1) | Omnirad 819 (4) | UV | — | 3.6 | 145.1 | 3.8 | 13.3 |
| Example 8f | 71 | 25.0 (nSP-1) | Omnirad 819 (4) | UV | — | 2.4 | 112.8 | 3.2 | 13.4 |
| Example 8g | 62.7 | 33.3 (nSP-1) | Omnirad 819 (4) | UV | — | 2.4 | 116.3 | 3.3 | 12.3 |
| Example 8h | 53.1 | 42.9 (nSP-1) | Omnirad 819 (4) | UV | — | 2.5 | 129.0 | 3.1 | 9.8 |

TABLE 4

| | | | | | | WVTR Data (at 50° C. and 10% Relative Humidity) | | | |
| Examples | SSBC-1 (wt. %) | nSP (wt. %) | Cross-linking agent and/or initiator (wt. %) | Curing conditions | Time of curing | Upright | Comparison with Comp. Ex. (%) | Upside down | Comparison with Comp. Ex. (%) |
|---|---|---|---|---|---|---|---|---|---|
| Comp. Ex. | 100 | — | — | — | — | 10000.0 | NA | 101303.0 | NA |
| Example 1a | 100 | — | — | 120° C. | 10 min. (Air) | 9106.0 | 91.0 | 102378.0 | 101.0 |
| Example 1b | 100 | — | — | 120° C. | 30 min. (Air) | 9384.0 | 94.0 | 86145.0 | 85.0 |
| Example 1c | 100 | — | — | 120° C. | 10 min. | 9619.0 | 96.0 | 93264.0 | 92.0 |
| Example 1d | 100 | — | — | 120° C. | 30 min. | 9677.0 | 97.0 | 96227.0 | 95.0 |
| Example 2a | 98 | 2 (nSP-2) | — | | | 9790.0 | 98.0 | 109230.0 | 105.0 |
| Example 2b | 98 | 2 (nSP-2) | — | 120° C. | 10 min. | 10006.0 | 100.0 | 101372.0 | 100.0 |
| Example 2c | 98 | 2 (nSP-2) | — | 120° C. | 30 min. | 9549.0 | 95.0 | 98206.0 | 97.0 |
| Example 3a | 95 | 5 (nSP-2) | — | | | 10096.0 | 101.0 | 124590.0 | 120.0 |
| Example 3b | 95 | 5 (nSP-2) | — | 120° C. | 10 min. | 9590.0 | 96.0 | 105964.0 | 105.0 |
| Example 3c | 95 | 5 (nSP-2) | — | 120° C. | 30 min. | 10239.0 | 102.0 | 98364.0 | 97.0 |
| Example 4a | 95 | 5 (nSP-1) | — | | | 9900.0 | 99.0 | 100950.0 | 100.0 |
| Example 4b | 95 | 5 (nSP-1) | — | 120° C. | 10 min. | 9851.0 | 99.0 | 95070.0 | 994.0 |
| Example 4c | 95 | 5 (nSP-1) | — | 120° C. | 30 min. | 9793.0 | 98.0 | 89793.0 | 89.0 |
| Example 5a | 100 | | — | EB - 200 | — | 10307.0 | 103.0 | 94993.0 | 94.0 |
| Example 5b | 98 | 2 (nSP-2) | — | EB - 200 | — | 10234.0 | 102.0 | 95956.0 | 95.0 |
| Example 5c | 95 | 5 (nSP-2) | — | EB - 200 | — | 9914.0 | 99.0 | 100150.0 | 99.0 |
| Example 5d | 95 | 5 (nSP-1) | — | EB - 200 | — | 10081.0 | 101.0 | 103115.0 | 102.0 |
| Example 6 | 94.4 | 5 (nSP-1) | HDDA (0.5) + Irgacure-651 (0.1) | UV | — | 9659.0 | 97.0 | 99980.0 | 99.0 |
| Example 7a-i | 95 | | Tolonate ™ HDB 75 (4) + K-FLEX ® 188 (1) | 90° C. | 10 min. | 7111 | 71 | 82331 | 81 |
| Example 7a-ii | 95 | | Tolonate ™ HDB 75 (4) + K-FLEX ® 188 (1) | 60° C. | 10 min. | 7915 | 79 | 102949 | 102 |
| Example 7b-i | 97 | | Tolonate ™ HDB 75 (2) + K-FLEX ® 188 (1) | 60° C. | 10 min. | 9502 | 95 | 105076 | 104 |
| Example 7b-ii | 97 | | Tolonate ™ HDB 75 (2) + K-FLEX ® 188 (1) | 90° C. | 10 min. | 8335 | 83 | 104621 | 103 |
| Example 7c | 96 | | Tolonate ™ HDB 75 (3) + K-FLEX ® 188 (1) | 90° C. | 10 min. | 8463 | 85 | 113126 | 112 |
| Example 8a | 96 | | Omnirad 819 (4) | UV | — | 7515 | 75 | 95485 | 94 |
| Example 8b | 90.7 | 5.3 (nSP-1) | Omnirad 819 (4) | UV | — | 8179 | 82 | 98562 | 97 |
| Example 8c | 88.5 | 7.5 (nSP-1) | Omnirad 819 (4) | UV | — | 8116 | 81 | 97389 | 96 |
| Example 8d | 84.9 | 11.1 (nSP-1) | Omnirad 819 (4) | UV | — | 8033 | 80 | 100097 | 99 |
| Example 8e | 78.4 | 17.6 (nSP-1) | Omnirad 819 (4) | UV | — | 8096 | 81 | 107305 | 106 |
| Example 8f | 71 | 25.0 (nSP-1) | Omnirad 819 (4) | UV | — | 7488 | 75 | 112724 | 111 |
| Example 8g | 62.7 | 33.3 (nSP-1) | Omnirad 819 (4) | UV | — | 6665 | 67 | 112714 | 111 |
| Example 8h | 53.1 | 42.9 (nSP-1) | Omnirad 819 (4) | UV | — | 7477 | 75 | 102294 | 101 |

NA: Not measured

The invention claimed is:

1. A composition comprising:
(a) a sulfonated styrenic block copolymer having an ion exchange capacity (IEC) of at least 0.5 meg/g, wherein the sulfonated styrenic block copolymer is obtained by sulfonation of a styrenic block copolymer precursor; and
(b) a sufficient amount of a non-sulfonated polymer which reacts with the sulfonated styrenic block copolymer to form a cross-linked sulfonated block copolymer, wherein the non-sulfonated polymer is an unhydrogenated block copolymer having a block D', a block B', optionally a block A', and mixtures thereof,
each block D' is derived from a conjugated diene monomer, having a vinyl content of 40-90 wt. %, based on total weight of the polymerized conjugated diene monomer in the block D';
each block A' is derived from at least one compound selected from polymerized (i) para-substituted styrene, (ii) ethylene, (iii) alpha olefins of 3 to 18 carbon atoms, (iv) 1,3-cyclodiene, (v) conjugated dienes, (vi) acrylic esters, (vii) methacrylic esters, and (viii) mixtures thereof, and
each block B' is derived from a vinyl aromatic monomer; and
wherein a film prepared from the composition containing the cross-linked sulfonated styrenic block copolymer has a toughness in wet state measured after 1 week of 1.2 to 8 MJ/m$^3$ and a tensile stress in wet state measured after 1 week of 3.2 to 8 MPa, both measurements according to ASTM D412.

2. The composition of claim 1, wherein the styrenic block copolymer precursor has a general configuration of: A-B-A, (A-B)$_n$(A), (A-B-A)$_n$, (A-B-A)$_n$X, (A-B)$_n$X, A-D-B, A-B-D, A-D-B-D-A, A-B-D-B-A, (A-D-B)$_n$A, (A-B-D)$_n$A (A-D-B)$_n$ X, (A-B-D)$_n$X, (A-D-B-D-A)$_n$X, (A-B-D-B-A)$_n$X, or mixtures thereof; wherein n is an integer from 2 to 30, and X is a residue of a coupling agent; blocks A and D are resistant to sulfonation; and block B is susceptible to sulfonation; and wherein:
each block A comprises polymerized para-substituted styrene monomers selected from the group consisting of para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, and mixtures thereof;
each block B comprises the polymerized vinyl aromatic monomers selected from the group consisting of unsubstituted styrene, ortho-substituted styrene, meta-substituted styrene, alpha-methylstyrene, 1,1-diphenylethylene, 1,2-diphenylethylene, and mixtures thereof; and
each block D comprises the polymerized conjugated diene monomers selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof.

3. The composition of claim 2, wherein the block B has a degree of sulfonation from 10 to 100 mol %, based on total mol of the block B.

4. The composition of claim 2, wherein the block D has a hydrogenation level of 60 to 99%; and each block A and B independently has a hydrogenation level of up to 20%.

5. The composition of claim 1, wherein the sulfonated styrenic block copolymer has a molecular weight (M$_p$) of 25 to 500 kg/mol.

6. The composition of claim 1, wherein the sulfonated styrenic block copolymer has an ion exchange capacity (IEC) of 0.5 to 2.6 meq/g.

7. The composition of claim 1, wherein the sulfonated styrenic block copolymer has a glass transition temperature (T$_g$) of 80 to 180° C., measured by Dynamic Mechanical Analysis (DMA) according to ASTM 4065.

8. The composition of claim 1, wherein the block B' constitutes from 5 to 40 wt. % and the block D' constitutes from 60 to 95 wt. %, based on total weight of the unhydrogenated styrenic block copolymer.

9. A composition comprising:
(a) a sulfonated styrenic block copolymer having an ion exchange capacity (IEC) of at least 0.5 meq/g, wherein the sulfonated styrenic block copolymer is obtained by sulfonation of a styrenic block copolymer precursor; and
(b) a sufficient amount of a non-sulfonated polymer which reacts with the sulfonated styrenic block copolymer to form a cross-linked sulfonated styrenic block copolymer, wherein the non-sulfonated polymer has at least one block D', and optionally a block selected from A', B', and mixtures thereof,
each block D' is derived from a conjugated diene monomer, having a vinyl content of 40-90 wt. %, based on total weight of the polymerized conjugated diene monomer in the block D';
each block A' is derived from at least one compound selected from polymerized (i) para-substituted styrene, (ii) ethylene, (iii) alpha olefins of 3 to 18 carbon atoms, (iv) 1,3-cyclodiene, (v) conjugated dienes, (vi) acrylic esters, (vii) methacrylic esters, and (viii) mixtures thereof,
each block B' is derived from a vinyl aromatic monomer; and
wherein the non-sulfonated polymer has a molecular weight (M$_p$) of 20 to 400 kg/mol, and a coupling efficiency of 50 to 95%; and
wherein a film prepared from the composition containing the cross-linked sulfonated styrenic block copolymer has a toughness in wet state measured after 1 week of 1.2 to 8 MJ/m$^3$, and a tensile stress in wet state measured after 1 week of 3.2 to 8 MPa, both measurements according to ASTM D412.

10. The composition of claim 1, wherein the non-sulfonated polymer has a general configuration of: (B'-D'-B')$_n$X, (D'-B'-D')$_n$X, (B'-D')$_n$X, (B'D')$_n$X (D')$_m$ or mixtures thereof, wherein each m and n is a positive integer from 2 to 30, and X is a residue of a coupling agent.

11. The composition of claim 1, wherein the non-sulfonated polymer is a polybutadiene having a 1,2 vinyl content of at least 70%.

12. The composition of claim 1, wherein the sufficient amount is 1 to 45 wt. %, based on total weight of the composition.

13. A composition comprising:
(a) a sulfonated styrenic block copolymer having an ion exchange capacity (IEC) of at least 0.5 meg/g, wherein the sulfonated styrenic block copolymer is obtained by sulfonation of a styrenic block copolymer precursor; and
(b) a sufficient amount of a cross-linking agent which reacts with the sulfonated styrenic block copolymer to form a cross-linked sulfonated styrenic block copolymer, wherein the cross-linking agent is selected from a polyisocyanate, a polyester diol, and mixtures thereof;

wherein a film prepared from the composition containing the cross-linked sulfonated styrenic block copolymer has a toughness in wet state measured after 1 week of 1.2 to 8 $MJ/m^3$ and a tensile stress in wet state measured after 1 week of 3.2 to 8 MPa, both measurements according to ASTM D412.

14. The composition of claim 13, wherein the sufficient amount is 0.1 to 15 wt. %, based on total weight of the composition.

15. The composition of claim 1, wherein the film has a thickness of 1 to 400 μm, and wherein the film is cross-linked/cured by heat, UV radiation, gamma radiation, electron-beam, or microwave, in the presence or absence of an initiator, wherein the initiator is any of a thermal initiator or a photo initiator.

16. The composition of claim 1, wherein the film has at least one of:
a tensile stress in dry state of 6.2 to 20 MPa;
a toughness in dry state of 3 to 25 $MJ/m^3$;
a Young's modulus in dry state of 190 to 600 MPa;
a Young's modulus in wet state after 1 week of 7.5 to 70 MPa;
an elongation at break in dry state of 75 to 250%; and
an elongation at break in wet state after 1 week of 60 to 150%;
all measurements according to ASTM D412.

17. The composition of claim 1, wherein the film has at least one of:
a moisture vapor transmission rate (MVTR) in an upright manner of 1000 to 30000 $g/m^2$/day; and
a moisture vapor transmission rate (MVTR) in an upside down manner of 1000 to 150000 $g/m^2$/day, both measurements according to ASTM E96/E96M.

\* \* \* \* \*